J. McDermott,
Dressing Stone.
No. 102,693. Patented May 3, 1870.
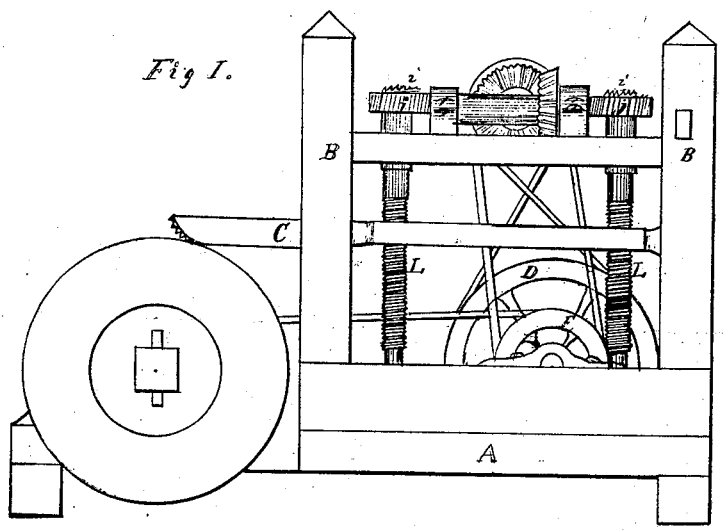
Fig. I.
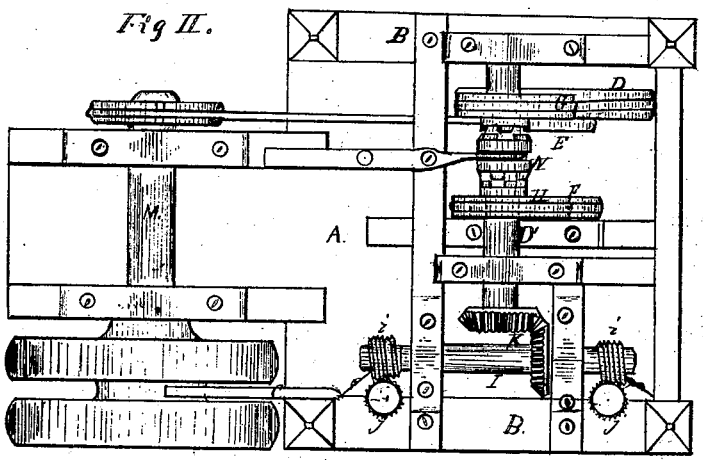
Fig. II.
Witnesses.
Geo. W. Tibbitts
C. E. Tibbitts
Inventor.
James McDermott
per Tibbitts

UNITED STATES PATENT OFFICE.

JAMES McDERMOTT, OF CLEVELAND, OHIO.

IMPROVED MACHINE FOR SPLITTING GRINDSTONES.

Specification forming part of Letters Patent No. 102,693, dated May 3, 1870.

*To all whom it may concern:*

Be it known that I, JAS. McDERMOTT, of Cleveland, in the county of Cuyahoga and State of Ohio, have invented certain Improvements in Stone-Splitting Machines, of which the following is a specification.

The nature of this invention relates to a machine for splitting grindstones by means of a bar having diamond teeth in the end, said bar being arranged to be carried down in the groove of the stone as fast as it is cut. The stone is placed on a mandrel, to be turned and split at one and the same time.

In quarrying stone, some is found to be in layers of a foot, or thereabout, in thickness, and will not split straight, so that it must be worked down to the proper thickness by chipping off, thus requiring much labor and waste of material.

This invention has for its object to obviate the above disadvantages.

In the accompanying drawings, Figure 1 is a side view. Fig. 2 is a plan view.

To a suitable base or foundation, A, is arranged a frame-work, B B, for supporting the machinery for operating the bar C.

D is a driving-pulley, on whose shaft are two other pulleys, E F. On the top of the frame B is a shaft, D', having loose pulleys G, H, which are driven by belts from the pulleys E F, the belt G E being crossed to give a reverse motion. Between the pulleys G H is a clutch, $n$, for changing the motion of the shaft D'.

To the side of the frame B is a shaft, I, at right angles to the shaft D' and driven by bevel-gear K. On the ends of the shaft I are screws $i$, which mesh with the heads $j$ of the upright screws L L. Said screws L L pass through the bar C and are for the purpose of carrying it up and down. The end of the bar C is made curved, and has a series of teeth, in which are set cutting-diamonds.

A suitable mandrel-shaft, M, is arranged in front of the machine, on which the stone is placed for turning, and may be driven by a belt from the pulley D. A man standing on each side with bars turns off the edge and sides of the stone. At the same time the bar C is carried down, cutting and dividing the stone into two parts.

I claim—

The bar C, having the teeth on the end and set with diamonds, as described, in combination with the mechanism consisting of the screws L L, shaft I, with screws $i\ i$, gears K, shaft D', clutch $n$, pulleys G E H F, or their equivalent devices, substantially as and for the purpose set forth.

JAMES McDERMOTT.

Witnesses:
GEO. W. TIBBITTS,
GEO. HESTER.